United States Patent
Kim et al.

(10) Patent No.: US 11,912,196 B2
(45) Date of Patent: Feb. 27, 2024

(54) APPARATUS FOR OUTPUTTING VIRTUAL ENGINE SOUND

(71) Applicants: HYUNDAI MOTOR COMPANY, Seoul (KR); Kia Corporation, Seoul (KR)

(72) Inventors: Keun Jin Kim, Seongnam-si (KR); Young Beom Kim, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 284 days.

(21) Appl. No.: 17/397,219

(22) Filed: Aug. 9, 2021

(65) Prior Publication Data
US 2022/0266747 A1    Aug. 25, 2022

(30) Foreign Application Priority Data
Feb. 22, 2021    (KR) .......................... 10-2021-0023606

(51) Int. Cl.
| | | |
|---|---|---|
| *B60Q 1/00* | (2006.01) | |
| *B60N 2/00* | (2006.01) | |
| *B60Q 5/00* | (2006.01) | |
| *B60R 19/48* | (2006.01) | |
| *B60R 19/22* | (2006.01) | |
| *H04R 1/02* | (2006.01) | |
| *H04R 1/28* | (2006.01) | |
| *B60R 19/18* | (2006.01) | |

(52) U.S. Cl.
CPC .............. *B60Q 5/008* (2013.01); *B60R 19/22* (2013.01); *B60R 19/48* (2013.01); *H04R 1/028* (2013.01); *H04R 1/2857* (2013.01); *B60R 2019/1873* (2013.01); *B60Y 2306/11* (2013.01); *H04R 2499/13* (2013.01)

(58) Field of Classification Search
CPC .... B60Q 5/008; B60Q 5/006; B60Q 2300/45; B60R 19/22; B60R 19/48; B60R 2019/1873; B60R 2019/1886; B60R 19/18; B60R 2019/1806; H04R 1/028; H04R 1/2857; H04R 2499/13; H04R 1/345; B60Y 2306/11; B60Y 2200/91; B60Y 2200/92; Y02T 10/62; Y04S 10/126
USPC ...................................... 340/425.5
See application file for complete search history.

(56) References Cited

U.S. PATENT DOCUMENTS

| | | | |
|---|---|---|---|
| 6,417,764 B2 * | 7/2002 | Tonkin | B60Q 1/444 340/436 |
| 2017/0106787 A1 * | 4/2017 | Kim | H04R 1/026 |
| 2021/0268979 A1 * | 9/2021 | Yanagisawa | B60R 19/483 |

FOREIGN PATENT DOCUMENTS

KR    10-2011-0122347 A    11/2011

* cited by examiner

*Primary Examiner* — Tanmay K Shah
(74) *Attorney, Agent, or Firm* — MORGAN, LEWIS & BOCKIUS LLP

(57) ABSTRACT

An apparatus for outputting a virtual engine sound includes: an output device that outputs the virtual engine sound; a bumper beam connected to a rear surface of the output device; and a bumper foam connected to the output device and the bumper beam while opening left and right side surfaces of the output device. The apparatus for outputting a virtual engine sound may improve a virtual engine sound output efficiency by utilizing a sound pressure radiated from a side surface of the virtual engine sound output device.

13 Claims, 6 Drawing Sheets

APPARATUS FOR OUTPUTTING VIRTUAL ENGINE SOUND

CROSS-REFERENCE TO RELATED APPLICATION

This application claims the benefit of priority to Korean Patent Application No. 10-2021-0023606, filed in the Korean Intellectual Property Office on Feb. 22, 2021, the entire contents of which are incorporated herein by reference.

TECHNICAL FIELD

The present disclosure relates to an apparatus for outputting a virtual engine sound.

BACKGROUND

An apparatus for outputting a virtual engine sound includes an output device that generates and outputs a virtual engine sound to inform a pedestrian of a travel state of a vehicle during travel of a hybrid vehicle or an electric vehicle.

In general, the output device includes an enclosure to prevent a phenomenon (acoustic shorting) in which a sound pressure radiated from a side surface (or a rear surface) of the output device cancels a sound pressure radiated toward a front surface of the output device. Such a structure allows the virtual engine sound to be easily radiated toward the front surface, but there is a limit in that the sound pressure radiated from the side surface (or the rear surface) is not be able to be utilized, which lowers an output efficiency of the virtual engine sound.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a virtual engine sound output apparatus capable of improving a virtual engine sound output efficiency by utilizing a sound pressure radiated from a side surface (or a rear surface) of a virtual engine sound output device.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for outputting a virtual engine sound includes an output device that outputs the virtual engine sound, a bumper beam connected to a rear surface of the output device, and a bumper foam connected to the output device and the bumper beam while opening left and right side surfaces of the output device.

In one implementation, a plurality of holes may be defined in each of the left and right side surfaces of the output device, and the plurality of holes may output the virtual engine sound in a left and right direction of the output device.

In one implementation, the bumper foam may surround the side surfaces of the output device such that the plurality of holes are opened, and extend in the left and right direction of the output device.

In one implementation, the bumper foam may define an output passage of the virtual engine sound output from the plurality of holes together with the bumper beam.

In one implementation, a cross-sectional shape of the output passage may include a square.

In one implementation, cross-sections of the output passage may have the same area.

In one implementation, the bumper foam may be designed to vary in length based on an output frequency of the virtual engine sound.

In one implementation, the bumper foam may include an apparatus for absorbing an impact applied from the outside of a vehicle.

In one implementation, the bumper foam may be made of an elastic material to be closely connected to the bumper beam.

In one implementation, the bumper beam may be connected to the rear surface of the output device, and extend in a left and right direction of the output device.

In one implementation, each of the plurality of holes may have a radius of equal to or smaller than 1 mm, and the number of holes may be variable based on a length of the bumper foam.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
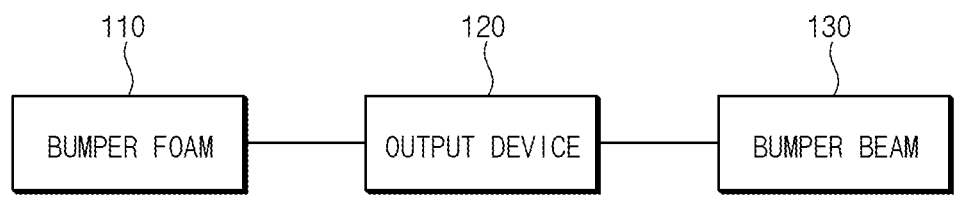
FIGS. 1 to 3 are diagrams showing a configuration of a virtual engine sound output apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
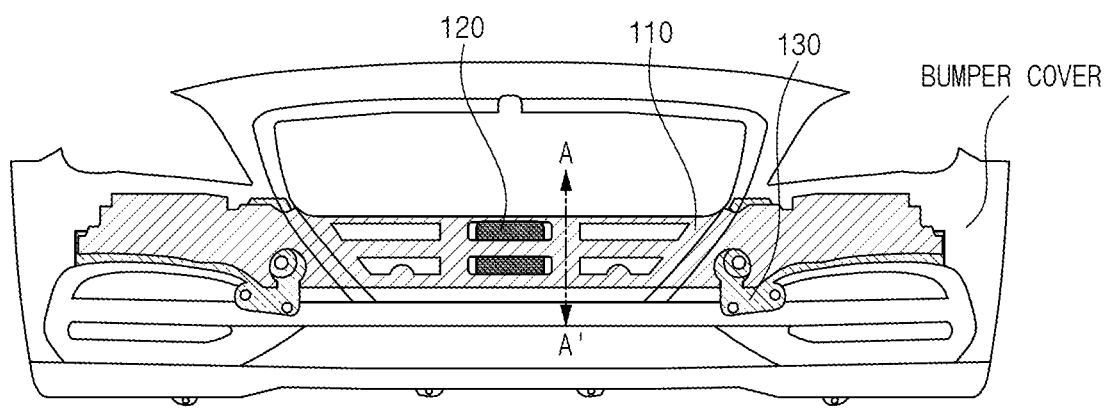
Figure 3:
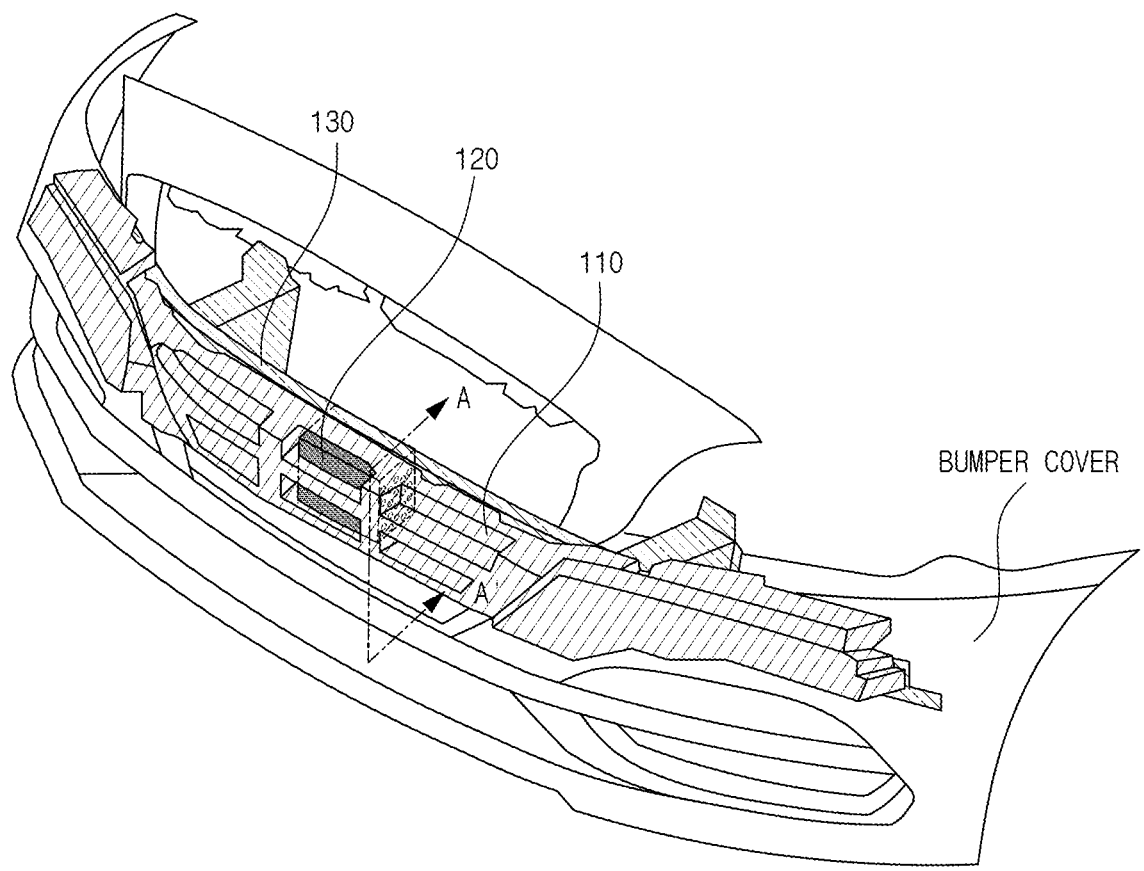

FIGS. 1 to 3 are diagrams showing a configuration of a virtual engine sound output apparatus according to an embodiment of the present disclosure.

As shown in FIGS. 1 to 3, a virtual engine sound output apparatus 100 of the present disclosure may include a bumper foam 110, an output device 120, and a bumper beam 130. The virtual engine sound output apparatus 100 according to an embodiment of the present disclosure may be disposed in a bumper cover. The bumper cover may protect the virtual engine sound output apparatus 100 disposed in the bumper cover and a main body of a vehicle, and may be made of an elastic material so as not to be broken when a collision occurs.

The bumper foam 110 may include an apparatus that absorbs an impact applied from the outside of the vehicle. According to an embodiment, the bumper foam 110 may be made of a polypropylene foam material, and may include an energy absorber. According to an embodiment of the present disclosure, the bumper foam 110 opens both side surfaces of the output device 120 and may be connected to the bumper beam 130. That is, the bumper foam 110 may be in close contact with the output device 120 by being connected to the bumper beam 130 while surrounding edges of the both side surfaces of the output device 120. The bumper foam 110 may be made of an elastic material to increase an adhesion of the bumper beam 130. The bumper foam 110 may extend in directions of the left and right side surfaces of the output device 120 along a curvature of the main body of the vehicle. According to an embodiment, the bumper foam 110 may be implemented to be connected to the bumper beam 130 while opening a plurality of holes defined in the side surfaces of the output device 120. Accordingly, a cross-sectional shape of the bumper foam 110 may be implemented in a 'U' shape.

In the present disclosure, the output device 120 may refer to any piece of computer hardware equipment which converts information into human readable form. For example, the output device 120 may be a speaker, speech synthesizer produces verbal output sounding almost like human speeches, or the like.

Figure 4:
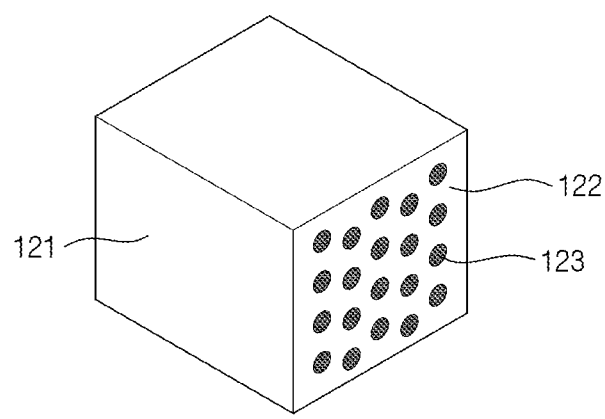
FIG. 4 is a diagram schematically showing an output device according to an embodiment of the present disclosure.

The output device 120 may generate and output a virtual engine sound. A more detailed description will be made with reference to FIG. 4. FIG. 4 is a diagram schematically showing an output device according to an embodiment of the present disclosure.

As shown in FIG. 4, the output device 120 may include a front surface 121 facing forward, and side surfaces 122 respectively connected to left and right edges of the front surface 121. Each of the front surface 121 and the side surfaces 122 of the vehicle may include a plurality of holes 123 for outputting the virtual engine sound in each of a frontward direction and a left and right direction of the vehicle. According to an embodiment of the present disclosure, the plurality of holes 123 may be designed in a size capable of maximizing a diffraction phenomenon of the virtual engine sound. As an example, the plurality of holes 123 may have a radius equal to or smaller than 1 mm, and the number of holes may be varied based on a length of the bumper foam 110.

The bumper beam 130 may be coupled to the main body of the vehicle to disperse and absorb the impact applied from the outside of the vehicle. To this end, the bumper beam 130 may extend in the directions of the side surfaces of the output device 120 along the curvature of the main body of the vehicle. According to an embodiment of the present disclosure, the bumper beam 130 may be connected to a rear surface of the output device 120.

The virtual engine sound output apparatus 100 according to an embodiment of the present disclosure will be described in more detail with reference to FIG. 5, which is a cross-section of FIGS. 2 and 3 cut in a direction A-A'.

Figure 5:
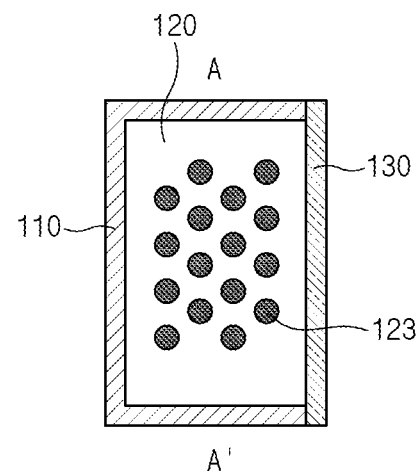
FIG. 5 is a diagram schematically showing a cross-section of a virtual engine sound output apparatus according to an embodiment of the present disclosure.

FIG. 5 is a diagram schematically showing a cross-section of a virtual engine sound output apparatus according to an embodiment of the present disclosure.

As shown in FIG. 5, the bumper foam 110 may be implemented in the 'U' shape (or more specifically a rectangular shape with one side open) surrounding the side surfaces of the output device 120 so as to open the plurality of holes defined in each side surface (122 in FIG. 4) of the output device 120 while being connected to the bumper beam 130. According to an embodiment, the cross-sectional shape of the bumper foam 110 may include the 'U' shape, and the bumper foam 110 may be implemented in the form extending in the directions of the left and right side surfaces of the output device 120 along the curvature of the main body of the vehicle. In addition, the bumper beam 130 may be fastened with the rear surface of the output device 120, and may be implemented in the form extending in the direction of the left and right side surfaces of the output device 120 along the curvature of the main body of the vehicle.

The bumper foam 110 and the bumper beam 130 of the present disclosure are in close contact with the both side surfaces of the output device 120 while opening only the plurality of holes defined in the both side surfaces of the output device 120. As a result, the virtual engine sound output from the plurality of holes 123 defined in the both side surfaces of the output device 120 may be prevented from leaking in the frontward direction of the vehicle. Accordingly, a problem (acoustic shorting) in which the virtual engine sound output in the frontward direction of the vehicle is canceled by the virtual engine sound output from the both side surfaces of the output device 120 may be improved. In addition, because the bumper foam 110 and the bumper beam 130 of the present disclosure are implemented in the form extending in the directions of the left and right side surfaces of the output device 120, the bumper foam 110 and the bumper beam 130 may play a role of an output passage (a wave guide) of the virtual engine sound.

Accordingly, the virtual engine sound output from the plurality of holes 123 defined in the both side surfaces of the output device 120 may not be radiated to the front surface of the output device 120, and may be radiated through the output passage defined by the bumper foam 110 and the bumper beam 130 in close contact with the both side surfaces of the output device 120. According to an embodiment of the present disclosure, a shape of a cross-section of the output passage defined by the bumper foam 110 and the bumper beam 130 may include a square, and the cross-sections of the output passage may have the same area to maximize a radiating efficiency of the virtual engine sound.

According to an embodiment of the present disclosure, the bumper foam 110 may be designed to have a variable length based on an output frequency of the virtual engine sound. The bumper foam 110 is designed to have the variable length based on the output frequency of the virtual engine sound, thereby further enhancing a virtual engine sound of a specific frequency, and outputting the further enhanced virtual engine sound not only in the frontward direction, but also in the left and right direction of the vehicle. A more detailed description will be made with reference to FIG. 6.

Figure 6:
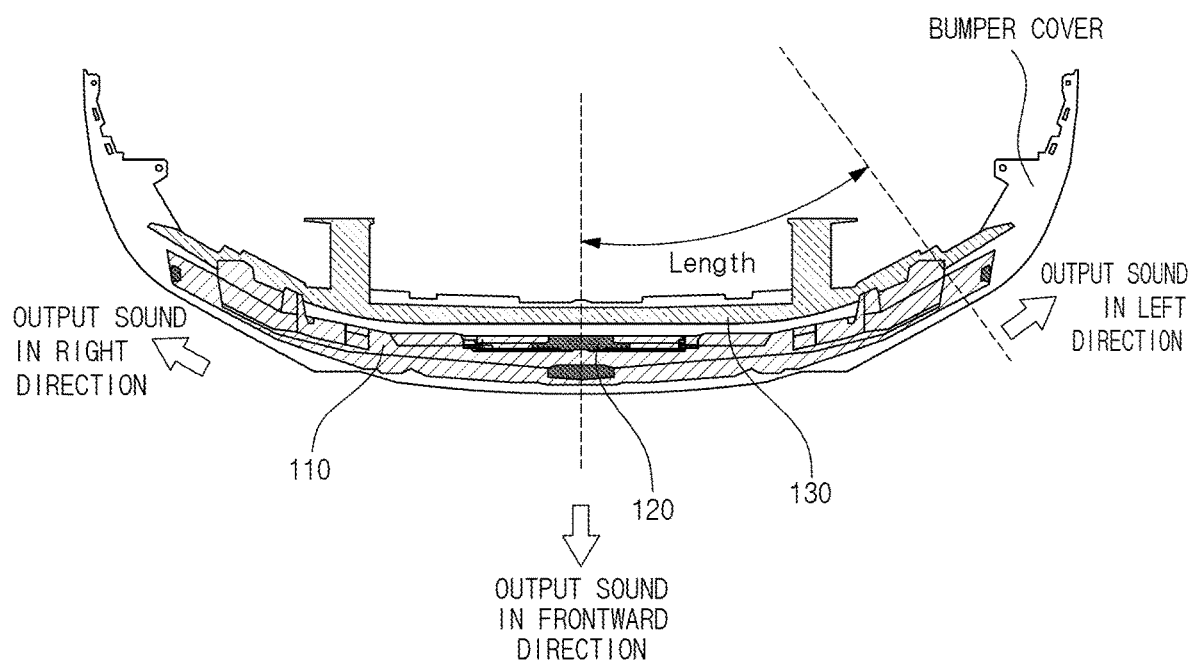
FIG. 6 is a diagram showing an output direction of a virtual engine sound according to an embodiment of the present disclosure.

FIG. 6 is a diagram showing an output direction of a virtual engine sound according to an embodiment of the present disclosure.

According to an embodiment of the present disclosure, the virtual engine sound may be radiated in the frontward direction of the output device 120, and may be radiated in the left and right direction of the vehicle through the output passage defined by the bumper foam 110 and the bumper beam 130 extending in the directions of the side surfaces of the output device 120. The length of the bumper foam 110 of the present disclosure may be designed using Equation 1 based on the ¼ wave pipe principle (length=wavelength*¼).

$$\text{length} = \text{sound speed}/\text{frequency}/4 \qquad <\text{Equation 1}>$$

For example, when the sound speed is 340 m/s and the frequency of the virtual engine sound is 85 Hz, the length is calculated as 1 m. That is, according to an embodiment of the present disclosure, when the frequency of the virtual engine sound is 85 Hz, the virtual engine sound may be output in the left and right directions of the vehicle by designing a length of a half of the bumper foam 110 to be 1 m. In addition, according to an embodiment of the present disclosure, when the output device 120 sets 85 Hz as a main frequency of the virtual engine sound, frequencies (170 Hz, 255 Hz, and the like) of multiples of the main frequency may be set as resonant frequencies and output.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The virtual engine sound output apparatus according to an embodiment of the present disclosure may improve the virtual engine sound output efficiency by utilizing the sound pressure radiated from the side surfaces of the virtual engine sound output device. As such, the virtual engine sound output apparatus according to an embodiment of the present disclosure allows the virtual engine sound to be radiated in the left and right direction as well as in the frontward direction of the vehicle, thereby easily transmitting the travel state of the vehicle to the pedestrian.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for outputting a virtual engine sound, the apparatus comprising:
    an output device configured to output the virtual engine sound;
    a bumper beam connected to a rear surface of the output device; and
    a bumper foam connected to the output device and the bumper beam while opening left and right side surfaces of the output device,
    wherein each of the left and right side surfaces of the output device has a plurality of holes, and
    wherein the virtual engine sound travels through the plurality of holes in a left and right direction of the output device.

2. The apparatus of claim 1, wherein the bumper foam surrounds the left and right side surfaces of the output device such that the plurality of holes are opened, and extends in the left and right direction of the output device.

3. The apparatus of claim 1, wherein the bumper foam defines an output passage of the virtual engine sound, which travels from the plurality of holes, together with the bumper beam.

4. The apparatus of claim 3, wherein a cross-sectional shape of the output passage includes a square.

5. The apparatus of claim 3, wherein cross-sections of the output passage have the same surface area.

6. The apparatus of claim 3, wherein a cross-sectional shape of the bumper has a rectangular shape with one side open.

7. The apparatus of claim 1, wherein the bumper foam has a length configured to be variable based on an output frequency of the virtual engine sound.

8. The apparatus of claim 1, wherein the bumper foam includes a material for absorbing an impact applied from the outside of a vehicle.

9. The apparatus of claim 1, wherein the bumper foam is composed of an elastic material which is connected to the bumper beam.

10. The apparatus of claim 1, wherein the bumper beam is connected to the rear surface of the output device, and extends in a left and right direction of the output device.

11. The apparatus of claim 1, wherein each of the plurality of holes has a radius of equal to or smaller than 1 mm, and
    wherein the number of the plurality of holes is variable based on a length of the bumper foam.

12. The apparatus of claim 1, wherein the output device comprises a front surface facing forward, and side surfaces respectively connected to left and right edges of the front surface, and
    wherein each of the front surface and the side surfaces includes the plurality of holes for outputting the virtual engine sound in each of a frontward direction and the left and right direction of the vehicle, respectively.

13. The apparatus of claim 11, wherein length of the bumper is calculated based on the following equation:

$$\text{Length} = \text{Sound speed} \div \text{frequency} \div 4.$$

* * * * *